United States Patent
Shokrollahi et al.

(10) Patent No.: US 9,369,312 B1
(45) Date of Patent: Jun. 14, 2016

(54) LOW EMI SIGNALING FOR PARALLEL CONDUCTOR INTERFACES

(71) Applicant: Kandou Labs SA, Lausanne (CH)

(72) Inventors: Amin Shokrollahi, Preverenges (CH); Nicolae Chiurtu, Lausanne (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 14/612,245

(22) Filed: Feb. 2, 2015

Related U.S. Application Data

(60) Provisional application No. 61/934,800, filed on Feb. 2, 2014.

(51) Int. Cl.
 *H04B 3/00* (2006.01)
 *H04L 25/02* (2006.01)
 *H04L 1/00* (2006.01)

(52) U.S. Cl.
 CPC ............ *H04L 25/028* (2013.01); *H04L 1/0057* (2013.01); *H04L 25/0272* (2013.01); *H04L 2001/0094* (2013.01)

(58) Field of Classification Search
 CPC ....... H03M 7/40; H03M 7/48; H03M 13/151; H04L 1/0058; H04L 1/0065; H04L 25/028; H04L 25/0272; H04L 1/0057; H04L 2001/0094
 USPC ......... 375/259–260, 265, 285, 257, 295–296; 455/63.1, 114.2
 See application file for complete search history.

(56) References Cited

U.S. PATENT DOCUMENTS

| | | | |
|---|---|---|---|
| 3,196,351 | A | 7/1965 | Slepian |
| 3,636,463 | A | 1/1972 | Ongkiehong |
| 3,939,468 | A | 2/1976 | Mastin |
| 4,163,258 | A | 7/1979 | Ebihara et al. |
| 4,181,967 | A | 1/1980 | Nash et al. |
| 4,206,316 | A | 6/1980 | Burnsweig et al. |
| 4,276,543 | A | 6/1981 | Miller |
| 4,486,739 | A | 12/1984 | Franaszek et al. |
| 4,499,550 | A | 2/1985 | Ray et al. |
| 4,774,498 | A | 9/1988 | Traa |
| 4,864,303 | A | 9/1989 | Ofek |

(Continued)

FOREIGN PATENT DOCUMENTS

| CN | 101478286 | 7/2009 |
|---|---|---|
| EP | 2039221 B1 | 3/2009 |

(Continued)

OTHER PUBLICATIONS

David Slepian, Permutation Modulation, IEEE, vol. 53, No. 3, Mar. 1965, pp. 228-236.

(Continued)

*Primary Examiner* — Khanh C Tran
(74) *Attorney, Agent, or Firm* — Invention Mine LLC

(57) ABSTRACT

Methods are disclosed for creation of vector signaling codes having reduced or minimized electromagnetic emissions when transmitted over multiple conductor communications media such as microstrip channels. Particular code formulation constraints are shown to correlate with physical propagation characteristics leading to beneficial cancellation of far fields from adjacent signal conductors, and the number of such constraints may be chosen to balance EMI characteristics with information encoding capacity in the resulting code.

20 Claims, 6 Drawing Sheets

(56) References Cited

U.S. PATENT DOCUMENTS

| | | | |
|---|---|---|---|
| 4,897,657 | A | 1/1990 | Brubaker |
| 5,053,974 | A | 10/1991 | Penz |
| 5,166,956 | A | 11/1992 | Baltus et al. |
| 5,168,509 | A * | 12/1992 | Nakamura ............ H03M 13/151 375/244 |
| 5,283,761 | A | 2/1994 | Gillingham |
| 5,287,305 | A | 2/1994 | Yoshida |
| 5,412,689 | A | 5/1995 | Chan et al. |
| 5,459,465 | A | 10/1995 | Kagey |
| 5,511,119 | A | 4/1996 | Lechleider |
| 5,553,097 | A | 9/1996 | Dagher |
| 5,599,550 | A | 2/1997 | Kohlruss et al. |
| 5,659,353 | A | 8/1997 | Kostreski et al. |
| 5,825,808 | A | 10/1998 | Hershey et al. |
| 5,875,202 | A | 2/1999 | Venters |
| 5,945,935 | A | 8/1999 | Kusumoto |
| 5,995,016 | A | 11/1999 | Perino |
| 6,005,895 | A | 12/1999 | Perino et al. |
| 6,084,883 | A | 7/2000 | Norrell et al. |
| 6,119,263 | A * | 9/2000 | Mowbray ............ H04M 13/091 375/260 |
| 6,172,634 | B1 | 1/2001 | Leonowich et al. |
| 6,175,230 | B1 | 1/2001 | Hamblin et al. |
| 6,232,908 | B1 | 5/2001 | Nakaigawa |
| 6,278,740 | B1 | 8/2001 | Nordyke |
| 6,346,907 | B1 | 2/2002 | Dacy |
| 6,359,931 | B1 | 3/2002 | Perino et al. |
| 6,404,820 | B1 | 6/2002 | Postol |
| 6,417,737 | B1 | 7/2002 | Moloudi et al. |
| 6,452,420 | B1 | 9/2002 | Wong |
| 6,483,828 | B1 | 11/2002 | Balachandran |
| 6,504,875 | B2 | 1/2003 | Perino et al. |
| 6,509,773 | B2 | 1/2003 | Buchwald |
| 6,556,628 | B1 | 4/2003 | Poulton et al. |
| 6,563,382 | B1 | 5/2003 | Yang et al. |
| 6,621,427 | B2 | 9/2003 | Greenstreet |
| 6,650,638 | B1 | 11/2003 | Walker et al. |
| 6,661,355 | B2 | 12/2003 | Cornelius et al. |
| 6,766,342 | B2 | 7/2004 | Kechriotis |
| 6,839,429 | B1 | 1/2005 | Gaikwad et al. |
| 6,954,492 | B1 | 10/2005 | Williams |
| 6,990,138 | B2 | 1/2006 | Bejjani |
| 6,999,516 | B1 | 2/2006 | Rajan |
| 7,023,817 | B2 | 4/2006 | Kuffner |
| 7,053,802 | B2 | 5/2006 | Cornelius |
| 7,085,153 | B2 | 8/2006 | Ferrant et al. |
| 7,142,612 | B2 | 11/2006 | Horowitz et al. |
| 7,142,865 | B2 | 11/2006 | Tsai |
| 7,167,019 | B2 | 1/2007 | Broyde et al. |
| 7,180,949 | B2 | 2/2007 | Kleveland et al. |
| 7,184,483 | B2 | 2/2007 | Rajan |
| 7,356,213 | B1 | 4/2008 | Cunningham et al. |
| 7,358,869 | B1 | 4/2008 | Chiarulli et al. |
| 7,362,130 | B2 | 4/2008 | Broyde et al. |
| 7,389,333 | B2 | 6/2008 | Moore et al. |
| 7,633,850 | B2 | 12/2009 | Ahn |
| 7,656,321 | B2 | 2/2010 | Wang |
| 7,706,524 | B2 | 4/2010 | Zerbe |
| 7,746,764 | B2 | 6/2010 | Rawlins et al. |
| 7,787,572 | B2 | 8/2010 | Scharf et al. |
| 7,882,413 | B2 | 2/2011 | Chen et al. |
| 7,933,770 | B2 | 4/2011 | Kruger et al. |
| 8,064,535 | B2 | 11/2011 | Wiley |
| 8,091,006 | B2 | 1/2012 | Prasad et al. |
| 8,106,806 | B2 | 1/2012 | Toyomura |
| 8,159,375 | B2 | 4/2012 | Abbasfar |
| 8,159,376 | B2 | 4/2012 | Abbasfar |
| 8,199,849 | B2 | 6/2012 | Oh |
| 8,279,094 | B2 | 10/2012 | Abbasfar |
| 8,295,250 | B2 | 10/2012 | Gorokhov |
| 8,310,389 | B1 | 11/2012 | Chui |
| 8,429,495 | B2 | 4/2013 | Przybylski |
| 8,442,099 | B1 | 5/2013 | Sederat |
| 8,442,210 | B2 | 5/2013 | Zerbe |
| 8,443,223 | B2 | 5/2013 | Abbasfar |
| 8,462,891 | B2 | 6/2013 | Kizer et al. |
| 8,520,493 | B2 | 8/2013 | Goulahsen |
| 8,547,272 | B2 | 10/2013 | Nestler et al. |
| 8,578,246 | B2 | 11/2013 | Mittelholzer |
| 8,588,280 | B2 | 11/2013 | Oh et al. |
| 8,593,305 | B1 | 11/2013 | Tajalli et al. |
| 8,649,445 | B2 | 2/2014 | Cronie et al. |
| 8,649,460 | B2 | 2/2014 | Ware et al. |
| 8,718,184 | B1 | 5/2014 | Cronie |
| 8,782,578 | B2 | 7/2014 | Tell |
| 8,989,317 | B1 | 3/2015 | Holden |
| 9,077,386 | B1 | 7/2015 | Holden |
| 2001/0055344 | A1 | 12/2001 | Lee et al. |
| 2002/0034191 | A1 | 3/2002 | Shattil |
| 2002/0044316 | A1 | 4/2002 | Myers |
| 2002/0057592 | A1 | 5/2002 | Robb |
| 2002/0163881 | A1 | 11/2002 | Dhong |
| 2002/0174373 | A1 | 11/2002 | Chang |
| 2003/0071745 | A1 | 4/2003 | Greenstreet |
| 2003/0105908 | A1 | 6/2003 | Perino et al. |
| 2003/0146783 | A1 | 8/2003 | Bandy et al. |
| 2003/0227841 | A1 | 12/2003 | Tateishi et al. |
| 2004/0003336 | A1 | 1/2004 | Cypher |
| 2004/0003337 | A1 | 1/2004 | Cypher |
| 2004/0057525 | A1 | 3/2004 | Rajan et al. |
| 2004/0086059 | A1 | 5/2004 | Eroz et al. |
| 2004/0156432 | A1 | 8/2004 | Hidaka |
| 2005/0057379 | A1 | 3/2005 | Jansson |
| 2005/0135182 | A1 | 6/2005 | Perino et al. |
| 2005/0149833 | A1 | 7/2005 | Worley |
| 2005/0152385 | A1 | 7/2005 | Cioffi |
| 2005/0174841 | A1 | 8/2005 | Ho |
| 2005/0286643 | A1 * | 12/2005 | Ozawa et al. ............... 375/242 |
| 2006/0115027 | A1 | 6/2006 | Srebranig |
| 2006/0159005 | A1 | 7/2006 | Rawlins et al. |
| 2007/0188367 | A1 | 8/2007 | Yamada |
| 2007/0260965 | A1 | 11/2007 | Schmidt et al. |
| 2007/0263711 | A1 | 11/2007 | Kramer et al. |
| 2007/0283210 | A1 | 12/2007 | Prasad et al. |
| 2008/0104374 | A1 | 5/2008 | Mohamed |
| 2008/0159448 | A1 | 7/2008 | Anim-Appiah et al. |
| 2008/0169846 | A1 | 7/2008 | Lan et al. |
| 2008/0273623 | A1 | 11/2008 | Chung et al. |
| 2008/0284524 | A1 | 11/2008 | Kushiyama |
| 2009/0059782 | A1 | 3/2009 | Cole |
| 2009/0092196 | A1 | 4/2009 | Okunev |
| 2009/0132758 | A1 | 5/2009 | Jiang |
| 2009/0154500 | A1 | 6/2009 | Diab et al. |
| 2009/0185636 | A1 | 7/2009 | Palotai et al. |
| 2009/0193159 | A1 | 7/2009 | Li |
| 2009/0212861 | A1 | 8/2009 | Lim et al. |
| 2009/0228767 | A1 | 9/2009 | Oh et al. |
| 2009/0257542 | A1 | 10/2009 | Evans et al. |
| 2010/0104047 | A1 | 4/2010 | Chen et al. |
| 2010/0180143 | A1 | 7/2010 | Ware et al. |
| 2010/0205506 | A1 | 8/2010 | Hara |
| 2010/0296550 | A1 | 11/2010 | Rjeily |
| 2011/0051854 | A1 | 3/2011 | Kizer et al. |
| 2011/0084737 | A1 | 4/2011 | Oh et al. |
| 2011/0127990 | A1 | 6/2011 | Wilson et al. |
| 2011/0235501 | A1 | 9/2011 | Goulahsen |
| 2011/0268225 | A1 | 11/2011 | Cronie et al. |
| 2011/0299555 | A1 | 12/2011 | Cronie et al. |
| 2011/0302478 | A1 | 12/2011 | Cronie et al. |
| 2011/0317559 | A1 | 12/2011 | Kern et al. |
| 2012/0063291 | A1 | 3/2012 | Hsueh |
| 2012/0161945 | A1 | 6/2012 | Single |
| 2012/0213299 | A1 | 8/2012 | Cronie et al. |
| 2013/0010892 | A1 | 1/2013 | Cronie et al. |
| 2013/0051162 | A1 | 2/2013 | Amirkhany et al. |

(56) References Cited

U.S. PATENT DOCUMENTS

| | | | |
|---|---|---|---|
| 2014/0254730 A1* | 9/2014 | Kim | H04B 15/00 375/346 |
| 2015/0010044 A1 | 1/2015 | Zhang | |
| 2015/0078479 A1* | 3/2015 | Whitby-Strevens | 375/296 |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion for PCT/EP2011/002170 mailed Jul. 14, 2011.
Mircea Stan et al., Bus-Invert Coding for Low-Power I/O, IEEE Transactions on Very Large Scale Integration (VLSI) Systems, vol. 3, No. 1, Mar. 1995, pp. 49-58.
Luca Tallini et al., Transmission Time Analysis for the Parallel Asynchronous Communication Scheme, IEEE Transactions on Computers, vol. 52, No. 5, May 2003, pp. 558-571.
International Search Report and Written Opinion for PCT/EP2012/052767 mailed May 11, 2012.
International Search Report and Written Opinion for PCT/EP2011/059279 mailed Sep. 22, 2011.
International Search Report and Written Opinion for PCT/EP2011/074219 mailed Jul. 4, 2012.
A.G. Burr, Spherical Codes for M-ARY Code Shift Keying, University of York, Apr. 2, 1989, pp. 67-72, United Kingdom.
Thomas Ericson et al., Spherical Codes Generated by Binary Partitions of Symmetric Pointsets, IEEE Transactions on Information Theory, vol. 41, No. 1, Jan. 1995, pp. 107-129.
Kamran Farzan et al., Coding Schemes for Chip-to-Chip Interconnect Applications, IEEE Transactions on Very Large Scale Integration (VLSI) Systems, vol. 14, No. 4, Apr. 2006, pp. 393-406.
Abbasfar, A. "Generalized Differential Vector Signaling," IEEE International Conference on Communications, ICC '09, (Jun. 14, 2009), pp. 1-5.
DaSilva, et al., "Multicarrier Orthogonal CDMA Signals for Quasi-Synchronous Communication Systems," IEEE Journal on Selected Areas in Communications, vol. 12, No. 5 (Jun. 1, 1994), pp. 842-852.
Wang et al., "Applying CDMA Technique to Network-on-Chip," IEEE Transactions on Very Large Scale Integration (VLSI) Systems, vol. 15, No. 10 (Oct. 1, 2007), pp. 1091-1100.
Cheng, Wei-Chung, "Memory Bus Encoding for Low Power: A Tutorial" Quality Electronic Design, IEEE, International Symposium on Mar. 26-28, 2001, pp. 199-204, Piscataway, NJ.
Clayton, Paul R., "Introduction to Electromagnetic Compatibility", Wiley-Interscience 2006, 18 pages.
Healey, A., et al., "A Comparison of 25 Gbps NRZ & PAM-4 Modulation used in Legacy & Premium Backplane Channels", DesignCon 2012, 16 pages.
International Search Report for PCT/US2014/053563, dated Nov. 11, 2014, 2 pages.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.
Skliar et al., A Method For the Analysis of Signals: the Square-Wave Method, Mar. 2008, Revista de Matematica: Teoria y Aplicationes, pp. 09-129.
International Search Report and Written Opinion from PCT/US2014/034220 mailed Aug. 21, 2014.
International Search Report and Written Opinion for PCT/US14/052986 mailed Nov. 24, 2014.
Notification of Transmittal of The International Search Report and The Written Opinion of the International Searching Authority, or The Declaration for PCT/EP2013/002681, dated Feb. 25, 2014, 15 pages.
Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.
Notification of Transmittal of International Search Report and The Written Opinion of the International Searching Authority, for PCT/US2015/018363, mailed Jun. 18, 2015, 13 pages.
Oh, et al., Pseudo-Differential Vector Signaling for Noise Reduction in Single-Ended Signaling, DesignCon 2009.
Zouhair Ben-Neticha et al, "The 'streTched-Golay and other codes for high-SNR finite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.
Jiang, A., et al., "Rank Modulation for Flash Memories", IEEE Transactions of Information Theory, Jun. 2006, vol. 55, No. 6, pp. 2659-2673.
Counts, L., et al., "One-Chip Slide Rule Works with Logs, Antilogs for Real-Time Processing," Analog Devices Computational Products 6, Reprinted from Electronic Design, May 2, 1985, 7 pages.
Design Brief 208 Using the Anadigm Multiplier CAM, Copyright 2002 Anadigm, 6 pages.
Grahame, J., "Vintage Analog Computer Kits," posted on Aug. 25, 2006 in Classic Computing, 2 pages, http.//www.retrothing.com/2006/08/classic_analog_html.
Schneider, J., et al., "ELEC301 Project: Building an Analog Computer," Dec. 19, 1999, 8 pages, http://www.clear.rice.edu/elec301/Projects99/anlgcomp/.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
"Introduction to: Analog Computers and the DSPACE System," Course Material ECE 5230 Spring 2008, Utah State University, www.coursehero.com, 12 pages.
Notification of Transmittal of The International Search Report and The Written Opinion of The International Searching Authority, or the Declaration, for PCT/US2014/015840, dated May 20, 2014. 11 pages.
Notification of Transmittal of The International Search Report and The Written Opinion of the International Searching Authority, or the Declaration, for PCT/US2014/043965, dated Oct. 22, 2014, 10 pages.
Notification of Transmittal of The International Search Report and The Written Opinion of the International Searching Authority, or The Declaration, dated Mar. 3, 2015, for PCT/US2014/066893, 9 pages.
International Preliminary Report on Patentability for PCT/US2014/015840, dated Aug. 11, 2015, 7 pages.
Loh, M., et al., "A 3x9 Gb/s Shared, All-Digital CDR for High-Speed, High-Density I/O", Matthew Loh, IEEE Journal of Solid-State Circuits, vol. 47, No. 3, Mar. 2012.

* cited by examiner

LOW EMI SIGNALING FOR PARALLEL CONDUCTOR INTERFACES

This application claims priority to U.S. application Ser. No. 61/934,800 filed Feb. 2, 2014 titled "Low EMI Signaling for Parallel Conductor Interfaces", the contents of which are incorporated herein by reference.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. Provisional Patent Application No. 61/812,667, filed Apr. 16, 2013, naming John Fox, Brian Holden, Ali Hormati, Peter Hunt, John D Keay, Amin Shokrollahi, Anant Singh, Andrew Kevin John Stewart, and Giuseppe Surace, entitled "Methods and Systems for High Bandwidth Communications Interface" (hereinafter called "Fox I"); The following reference is also cited in this document:

Paul R. Clayton, Introduction to Electromagnetic Compatibility, Wiley-Interscience, 2006, herein referred to as [Clayton 2006].

BACKGROUND

Communications interfaces using multiple wire connections are well represented in the art. Historically, parallel wire cables were supplanted by twisted pair and shielded cables at low frequencies and stripline and microstrip transmission lines at higher frequencies, in an effort to minimize electromagnetic interference (EMI) emission. Vector signaling is a method of signaling. With vector signaling, pluralities of signals on a plurality of wires are considered collectively, although each of the plurality of signals may be independent. One encoded unit of the vector signaling code is termed a "codeword", and each of the collective signals of a codeword is referred to as a component, with the number of signals communicated on the plurality of wires representing one codeword referred to as the "dimension" of the vector.

With binary vector signaling, each component takes on a coordinate value (or "coordinate", for short) that is one of two possible values. As an example, eight single ended signaling wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. A "binary vector signaling code" refers to a mapping and/or set of rules to map information bits to binary vectors.

With non-binary vector signaling, each component has a coordinate value that is a selection from a set of more than two possible values. A "non-binary vector signaling code" refers to a mapping and/or set of rules to map information bits to non-binary vectors. The ability of a vector signaling code to encode data is constrained by the number of codewords in the code, with larger codeword sets being capable of encoding more data. The ratio of encoded data capacity (i.e., the binary logarithm of the number of codewords) to the dimension of the codewords (or equivalently, to the number of actual bits transmitted via the codeword versus the number of physical pins or wires needed to communicate that number of bits in parallel,) is known as the pin-efficiency of the vector signaling code. Examples of vector signaling methods are described in Cronie I, Cronie II, and Fox I.

Viewed as a layered networking model, significant effort has been expended at the physical layer to optimize wiring, transmission line characteristics, signal amplitudes, etc. to minimize undesirable signal emission. An analysis of signal coding methods indicates that significant EMI reduction may be obtained by careful selection of appropriate signal encodings, such as particular vector signaling codes, for signals transmitted over such physical media.

BRIEF DESCRIPTION

Properties and the construction method of signaling schemes are disclosed for codes that reduce electromagnetic interference produced by several parallel conductors when excited with that particular signaling. Such codes makes easier to fulfill the EMI/EMC requirements set by international regulations.

First, the E-field produced by several equally spaced parallel conductors excited with some signaling scheme is derived. Second, the construction of codes is disclosed for a signaling scheme to minimize electromagnetic interference (EMI) produced by the currents in the conductors, and specific examples of code construction are provided. Finally, electromagnetic simulations of the E-field are documented which support the theoretical findings and claims.

DETAILED DESCRIPTION

Figure 1:
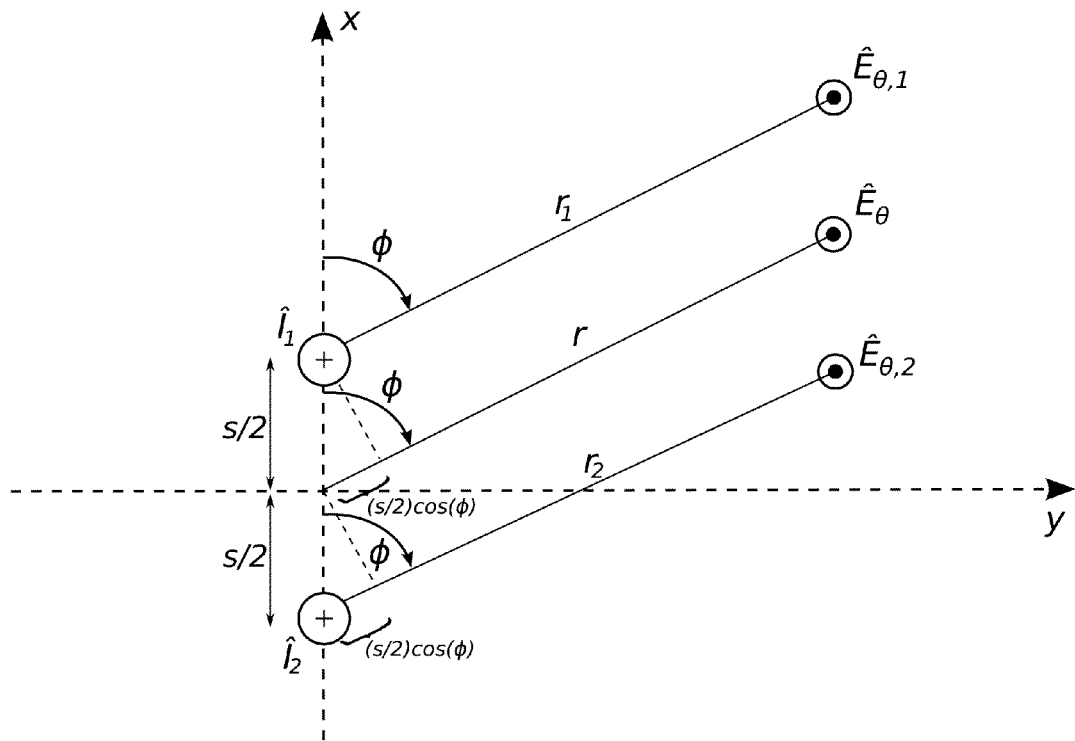
FIG. 1 illustrates the calculation of the far fields for two wire currents.

We consider a system with a number N of equally spaced parallel conductors, each carrying some current $I_l, l=0 \ldots N-1$. Each conductor can be modeled as a Hertzian dipole, and the E-field (far field) generated by the current $\hat{I}_l$ of the $l^{th}$ conductor at distance $r_l$ being expressed according to [Clayton 2006] as:

$$\hat{E}_\theta = \hat{M} \hat{I}_l \frac{e^{-j\beta_0 r_l}}{r_l} F(\theta) \quad \text{[Eqn. 1]}$$

where $\hat{I}_l$ is the current at the center of the conductor and the factor $F(\theta)$ has a maximum value of unity and presents the $\theta$ variation of the antenna (E-field) pattern. $\beta_0 = 2\pi/\lambda_0 = 2\pi f/c$ where f is the frequency in Hz and $c=3\cdot 10^8$ is the speed of light in vacuum. We herein denote $\theta$ and $\phi$ as identifying the two angles of a spherical coordinate system, in which $\phi$ is the angle with respect to the axis on which the conductor is aligned, and $\theta$ is the angle around the axis of the conductor. FIG. 1 from [Clayton 2006] illustrates an example of a system with 2 parallel conductors using this notation.

One should note that, by symmetry, the pattern of the antenna is independent of $\phi$ but the pattern of a pair of antennas (conductors) can be a function of $\phi$. The term $\hat{M}$ is a function of the antenna type. For a Hertzian dipole, the terms $\hat{M}$ and $F(\theta)$ are:

$$\hat{M} = j2\pi \times 10^{-7} fL \quad \text{[Eqn. 2]}$$
$$F(\theta) = \sin\theta$$

where L represents the length of the conductors. The above formulas are valid only for current segments that are very short electrically, which allows us to assume that the current at all points along the antenna is the same (magnitude and phase). For these linear, wire-type antenna, the radiated electrical field achieves its maximum amplitude broadside to the antenna, that is $\theta = 90°$. Hence, the radiated electric field $\hat{E}_\theta$ is parallel to the conductor axis, and $F(\theta)=1$.

The total E-field generated by the N parallel conductors placed equidistantly at distance s from each other will be the superposition of the fields generated by each conductor in separation:

$$\hat{E}_\theta = \sum_{l=0}^{N-1} \hat{E}_{\theta,l} = \hat{M} \sum_{l=0}^{N-1} \hat{I}_l \frac{e^{-j\beta_0 r_l}}{r_l} \quad \text{[Eqn. 3]}$$

In terms of the distance r from the midpoint between the conductors to the measurement point, the N rays can be written as:

$$r_l = r - \left(\frac{N-1}{2} - l\right) s\cos\phi \quad l = 0 \ldots N-1 \quad \text{[Eqn. 4]}$$

Since we are considering only the far field, the radial distances from the N conductors are approximately equal, that is, $r_0 \cong r_1 \cong \ldots \cong r_{N-1} \cong r$. We may substitute $r_0 = r_1 = \ldots = r_{N-1} = r$ into the denominator of the E-field formula, but we should not make the substitution into the $e^{-j\beta_0 r_l}$ terms for the following reason. This term can be written as $e^{-j2\pi r_l/\lambda_0}$, and its value depends not on the physical distance $r_l$ but on the electrical distance $r_l/\lambda_0$. Therefore, even though two rays $r_0$ and $r_1$ may be approximately equal, the exponential term can depend significantly on the difference in electrical distances. For example, if f=3GHz ($\lambda_0$=10 cm) and $r_0$=10 m, $r_1$=10.5 m, the quantities $\beta_0 r_0$ and $\beta_0 r_1$ differ by 180°, so the fields are of opposite phases! For our system, the maximum of the E-field will occur in the plane of the wires and on a line perpendicular to the wires ($\phi = 0°, 180°$). With the new substitutions, we obtain:

$$\hat{E}_{max} = \hat{M} \frac{e^{-j\beta_0 r}}{r} \sum_{l=0}^{N-1} \hat{I}_l e^{j\left(\frac{N-1}{2} - l\right)\beta_0 s} \quad \text{[Eqn. 5]}$$

We assume that the currents $\hat{I}_l$ are produced by a driver which generates on each of the conductors $l=0 \ldots N-1$ a current level proportional with the transmitted codeword $c_l$ on that particular wire, i.e., $\hat{I}_l = \alpha * c_l$, where $\alpha$ is some real valued scalar constant which depends on the transmitter driver architecture. We can also rewrite the quantity in the exponent as:

$$j\left(\frac{N-1}{2} - l\right)\beta_0 s = j\left(\frac{N-1}{2} - l\right)\frac{2\pi}{\lambda} s = j\left(\frac{N-1}{2} - l\right)\frac{2\pi f}{c} s \quad \text{[Eqn. 6]}$$

In the following we use the Taylor series expansion to rewrite the exponential term:

$$e^x = \sum_{n=0}^{\infty} \frac{x^n}{n!} = 1 + x + \frac{x^2}{2!} + \frac{x^3}{3!} + \frac{x^4}{4!} + \ldots \quad \text{[Eqn. 7]}$$

For conductor inter-spacing in the order of a few hundred microns, and frequencies in the range of a few GHz, the quantity in the exponent is much smaller than unity. For example, for s=100 µm, f=1 GHz, N=4 and l=0, the absolute value of the exponent is $1.5 \cdot 2\pi \cdot 10^9 \cdot 10^{-4}/(3 \cdot 10^8) \cong 3.14 \cdot 10^{-3} \ll 1$. In this case, it is reasonable to assume that the first two terms from the Taylor expansion are dominant and that the contribution from the other terms to the total sum is negligible:

$$e^{j\left(\frac{N-1}{2} - l\right)\beta_0 s} = 1 + j\left(\frac{N-1}{2} - l\right)\beta_0 s + f_\varepsilon(\beta_0, s, l) \quad \text{[Eqn. 8]}$$

where $f_\varepsilon(\beta_0, s, l)$ is a small quantity accumulating the summation of the remaining Taylor expansion terms. Then, the magnitude of the E-field can be written as $$|\hat{E}_{max}| = \alpha \frac{|\hat{M}|}{r} \left| \sum_{l=0}^{N-1} c_l e^{j\left(\frac{N-1}{2} - l\right)\beta_0 s} \right| \quad \text{[Eqn. 9]}$$

$$= \alpha \frac{2\pi \times 10^{-7} fL}{r} \left| \sum_{l=0}^{N-1} c_l \left(1 + j\left(\frac{N-1}{2} - l\right)\beta_0 s + f_\varepsilon(\beta_0, s, l)\right) \right| \quad \text{[Eqn. 10]}$$

$$= \alpha \frac{2\pi \times 10^{-7} fL}{r} \left| \sum_{l=0}^{N-1} c_l + j\beta_0 s \frac{N-1}{2} \sum_{l=0}^{N-1} c_l - j\beta_0 s \sum_{l=0}^{N-1} l c_l + \sum_{l=0}^{N-1} c_l f_\varepsilon(\beta_0, s, l) \right| \quad \text{[Eqn. 11]}$$

If we have a codebook with P codewords, $C=\{c_1 \ldots c_P\} \subseteq \mathbb{R}^N$, the average E-field over all the codewords (that is, all of the conductor currents utilized in practice) will be $$|\hat{E}_{max}| = 2\pi \times 10^{-7} \frac{fL}{r} \alpha \frac{1}{P} \sum_{i=1}^{P} \left| \sum_{l=0}^{N-1} c_{il} + \right. \quad \text{[Eqn. 12]}$$

$$\left. j\beta_0 s \frac{N-1}{2} \sum_{l=0}^{N-1} c_{il} - j\beta_0 s \sum_{l=0}^{N-1} lc_{il} + \sum_{l=0}^{N-1} c_{il} f_\epsilon(\beta_0, s, l) \right|$$

where $c_{il}$ represents the $i^{th}$ codeword component on wire l. Note that the term $f\epsilon(\beta_0, s, l)$ leads to summations of the form $\Sigma_{l=0}^{N-1} c_{il}$, $\Sigma_{l=0}^{N-1} lc_{il}$, $\Sigma_{l=0}^{N-1} l^2 c_{il}$, etc.

Low EMI Code Properties and Design

The expression of the E-field derived in Eqn. 12 shows that in order to design low emissions (EMI) codes one needs to construct them such that to minimize the summations $\Sigma_{l=0}^{N-1} c_{il}$, $\Sigma_{l=0}^{N-1} lc_{il}$, $\Sigma_{l=0}^{N-1} l^2 c_{il}$, etc. The first two terms are more critical to this minimization, as they are the dominant quantities in the E-field expression. As commonly used in descrete mathematics, in the following we will associate with a codeword $[c_0, c_1, \ldots, c_{N-1}]$ a polynomial of degree N-1, $p(x) = c_{N-1} x^{N-1} + \ldots + c_1 x + c_0$.

The codes which minimize the EMI can be designed as follows. As a first criterion, to satisfy the condition $\Sigma_{l=0}^{N-1} c_{il} = 0$ (i.e. first order equal to zero,) it follows directly that the code polynomial should evaluate to 0 at 1, i.e., that the code polynomial should be divisible by (x−1). This means that we may generate a first-order low EMI code, by taking any code $C' \subseteq \mathbb{R}^{N-2}$, interpreting its codewords as polynomials of maximum degree N−2, and multiplying this polynomial by (x−1). The coefficients of the resulting polynomial will give us the desired new codewords.

As a second criterion, to satisfy the conditions $\Sigma_{l=0}^{N-1} c_{il} = 0$ and $\Sigma_{l=0}^{N-1} lc_{il} = 0$ (first order and second order equal to zero,) the codeword polynomials should be divisible by $(x-1)^2$. This follows from noting that the previous two conditions are equivalent to $\Sigma_{l=0}^{N-1} c_{il} = 0$ and $\Sigma_{l=0}^{N-1} (l-1) c_{il} = 0$.

In general, if we want to design a code which satisfies $\Sigma_{l=0}^{N-1} l^k c_{il} = 0$, $\forall k = 0 \ldots M-1$, $M \geq 1$, we can construct it by taking any code $C' \subseteq \mathbb{R}^{N-M-1}$ defined by a polynomial of maximum degree N−M−1 and then multiply the codeword polynomials by $(x-1)^M$. The coefficients of the resulting polynomial will give us the desired new codewords.

A variation of this construction strategy constrains one or more lower-order terms to be zero, and then bounds the next term to be less than a fixed amount.

This construction mechanism permits the creation of a code having the desired EMI characteristics from an existing code. In the general case, the new code will have a large dimension (i.e. require one or more signal conductors) than the original code from which it was created. In other words, the new code will in general have a lower pin-efficiency than the original code, but will result in much lower EMI emissions.

Low EMI Code Examples

As a first example of how the described method leads to reduced EMI codes, consider the case of two parallel conductors, N=2, M=1. We consider C'={±1} and the generator polynomial (x−1). The low EMI code is defined by ±1(x−1), and its corresponding codewords will be [1, −1] and [−1,1] which is in fact differential signaling, which is known in the art to be a low-emission encoding for wire pairs. This code satisfies $\Sigma_{l=0}^{N-1} c_{il} = 0$.

In a second example consider three conductors, N=3, M=2. We consider C'={±½} The low EMI code is defined by ±½(x−1)²=±½(x²−2x+1) and its corresponding codewords are [½, −1, ½] and [−½, 1, −½]. Note that this code satisfies both $\Sigma_{l=0}^{N-1} c_{il} = 0$ and $\Sigma_{l=0}^{N-1} lc_{il} = 0$.

In a third example of the described method for four conductors, N=4, M=2. We consider C'={±1}. The low EMI code is chosen to be defined by ±1(x+1)(x−1)²=±(x³−x²−x+1) and its corresponding codewords are [1, −1, −1, 1] and [−1, 1, 1, −1]. Note that this code satisfies both $\Sigma_{l=0}^{N-1} c_{il} = 0$ and $\Sigma_{l=0}^{N-1} lc_{il} = 0$ and differs from the conventional practice of using two parallel differential pairs; conventional practice would suggest use of the codewords [1, −1, 1, −1], [−1, 1, −1, 1], [1, −1, −1, 1], and [−1, 1, 1, −1] (that is, with the two differential pairs operating independently,) whereas the described method identifies only two of the four differential pair codewords as having low EMI characteristics.

Figure 6:
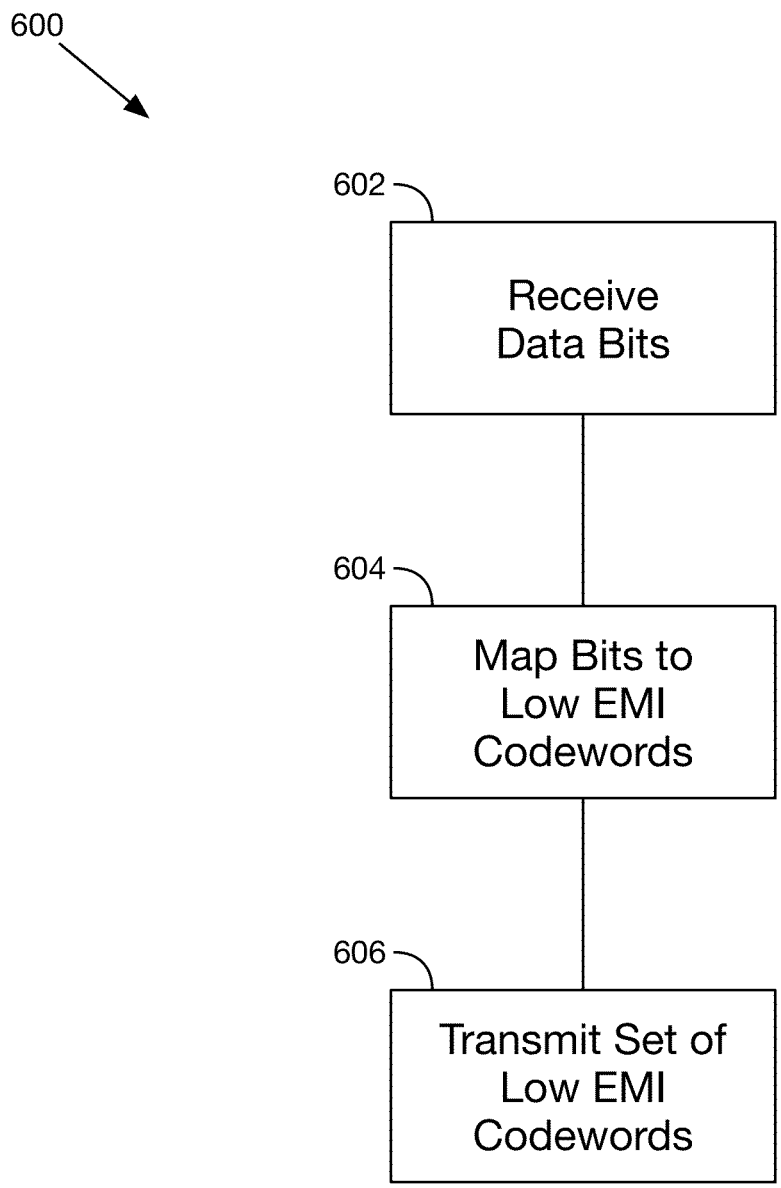
FIG. 6 depicts a flowchart of a process in accordance with at least one embodiment.

In one embodiment a method 600 is described with respect to FIG. 6. At block 602 a set of data bits representing information is received. At block 604 the data bits are mapped to low EMI codewords in a set of low EMI codewords, wherein the set of low EMI codewords when represented as a polynomial are divisible by the polynomial $(X-1)^M$ where M is at least 1. At block 606 the set of low EMI codewords are transmitted on a multiwire system. The method may generate the set of low EMI codewords by modulating an initial set of codewords represented as a polynomial of maxiumum degree N−M−1 and a polynomial $(X-1)^M$ where N is a number of wires in the multiwire system and M is an order of electromagnetic interference reduction. The method may utilize a system wherein M is at least 2, representing a plurality of orders of electromagnetic interference reduction. The method may utilize a system wherein the initial set of codewords are formed using a Hadamard matrix with a size of at least 3. The method may utilize a system wherein the Hadamard matrix is an ENRZ code. The method may utilize a system wherein N is at least 3.

Constructing Low EMI Codes

One embodiment of a constructed Low-EMI code begins with an initial three symbol code comprised of all possible combinations of the symbol alphabet {+1, −1}, in other words a three-bit binary code. With three values each having two possibilities, this code has eight codewords. As taught by [Cronie I] and [Cronie II], the Hadamard transform of size 4 (also known as the H4 matrix) may be used to transform this initial three bit code into a new code having eight codewords representing all permutations of [+3, −1, −1, −1] and [−3, +1, +1, +1]. Also known as Ensemble NRZ or ENRZ, the H4 codewords are often shown with a constant ⅓ scaling factor, producing a symbol alphabet of {+1 +⅓, −⅓, −1}. The H4 or ENRZ code is balanced, thus satisfying $\Sigma_{l=0}^{N-1} c_{il} = 0$.

It should be noted that transmission of the initial three bit binary code requires three wires, and its detection requires three receivers each comparing one wire against a fixed reference. Thus, the initial code has no inherent protection against common mode noise. In comparison, the transformed code requires one additional wire but, as taught by [Fox I], may be detected by three comparators performing only differential comparisons among the wires, thus providing common mode noise rejection.

A second embodiment uses a Hadamard matrix of size 8 (also known as H8 matrix) as taught by [Cronie I] and [Cronie II] multiplied by the vectors (0, 0, 0, ±1, 0, ±1, ±1, ±1) to produce a code capable of transmitting 4 bits on 8 wires, with both $\Sigma_{l=0}^{N-1} c_{il} = 0$ and $\Sigma_{l=0}^{N-1} lc_{il} = 0$, that is, both first order and second order equal to zero. Multiplying H8 by [0, 0, ..., 0, ±1] produces a code having first, second, and third order 0, but with only two codewords, thus being capable of encoding only one bit on 8 wires.

A further embodiment uses the Hadamard matrix of size sixteen (H16) in a similar fashion; Multiplying H16 by the vector $(0, \pm1, \pm1, \ldots, \pm1)$ gives a first order 0 and can encode 15 bits on 16 wires. Multiplying H16 by the vector $[0, 0, 0, \pm1, 0, \pm1, \pm1, \pm1, 0, \pm1, \pm1, \pm1, \pm1, \pm1, \pm1, \pm1]$ gives a first and a second order 0, and can encode 11 bits on 16 wires. Multiplying H16 by $[0, 0, 0, 0, 0, 0, 0, \pm1, 0, \pm1, 0, 0, 0, \pm1, 0, \pm1, \pm1, \pm1]$ gives a code having first, second, and third order 0, and capable of encoding 6 bits on 16 wires. Finally, multiplying H16 by $[0, 0, \ldots, 0, \pm1]$ produces a code having first, second, third, and fourth order 0, but with only two codewords, thus being capable of encoding only one bit on 16 wires.

Thus, the described method may be used to derive new codes having Low-EMI characteristics from an initial code, with a wide range of trade offs available between EMI characteristics and pin-efficiency for the resulting code.

Electromagnetic Simulation Results

Figure 2:
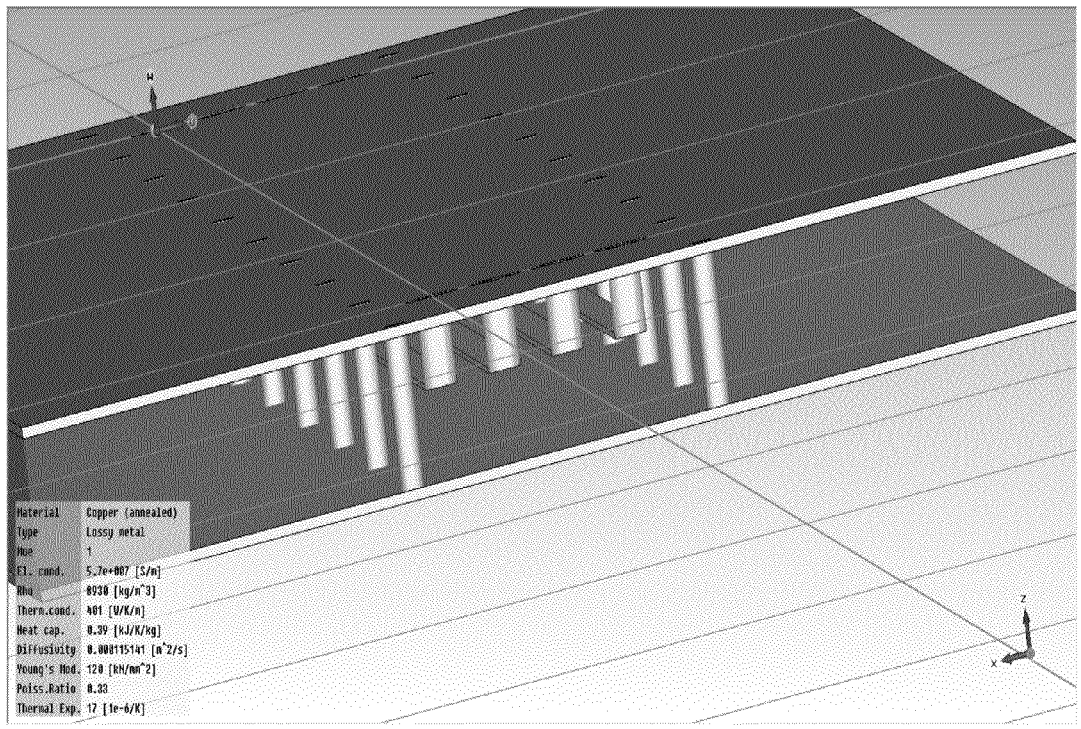
FIG. 2 is an illustration of a four conductor stripline transmission line.
Figure 3:
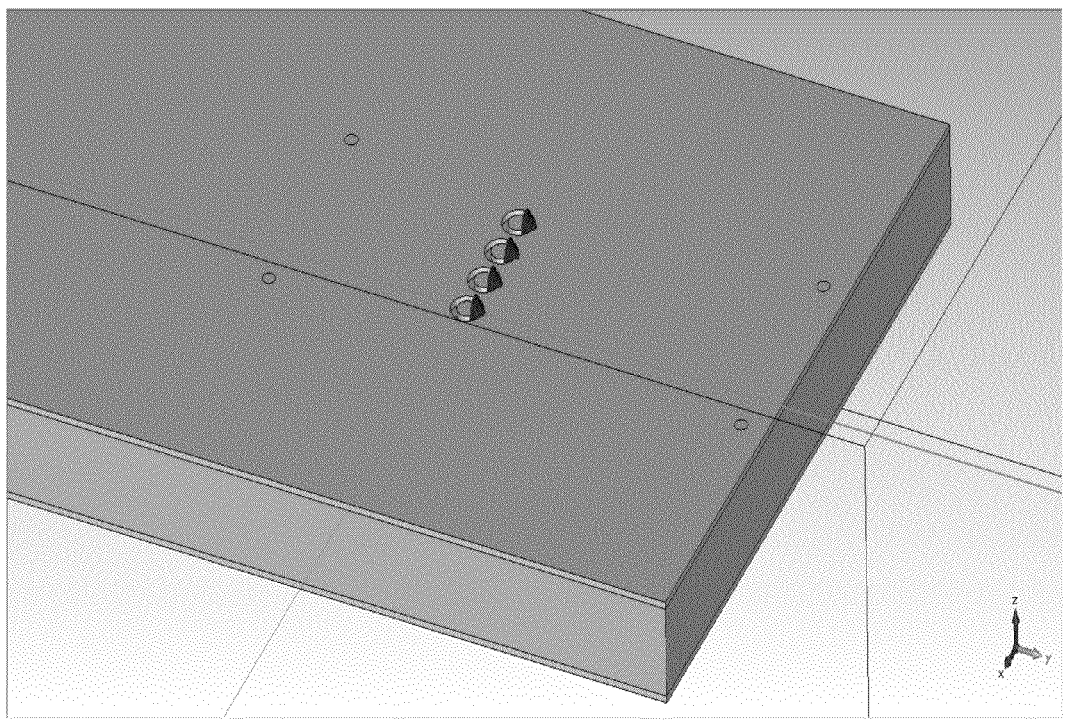
FIG. 3 is a detail of the four conductor stripline transmission line of FIG. 2.

In order to confirm these theoretical results, the 3D electromagnetic simulation software CST Microwave Studio (CST MWS) was used to evaluate the E-field (farfield) produced by a stripline structure when excited with several signaling schemes and confirm their emissions follow the tendencies derived earlier. Due to their low insertion losses and good impedance control and matching, striplines with vias represent a preferred structure for transmitting very high speed electrical signals. We choose N=4 and the considered stripline transmission lines are depicted in FIGS. 2 and 3. For some chosen codewords, in Table 1 we compute the quantities $\Sigma_{l=0}^{N-1} c_{il}$ and $\Sigma_{l=0}^{N-1} |c_{il}|$.

TABLE 1

E-field for various codewords

| Codeword | $|\Sigma_{l=0}^{N-1} c_{il}|$ | $|\Sigma_{l=0}^{N-1} |c_{il}||$ |
|---|---|---|
| [1, −1, −1, 1] | 0 | 0 |
| [⅓, −1, ⅓, ⅓] | 0 | ⅔ |
| [0, −1, 1, 0] | 0 | 1 |
| [1, −⅓, −⅓, −⅓] | 0 | 2 |
| [1, 0, −1, 0] | 0 | 2 |
| [1, −1, 1, −1] | 0 | 2 |
| [1, 0, 0, −1] | 0 | 3 |
| [0, 1, 1, 0] | 2 | 3 |
| [1, 1, 1, 1] | 4 | 6 |

Figure 4:
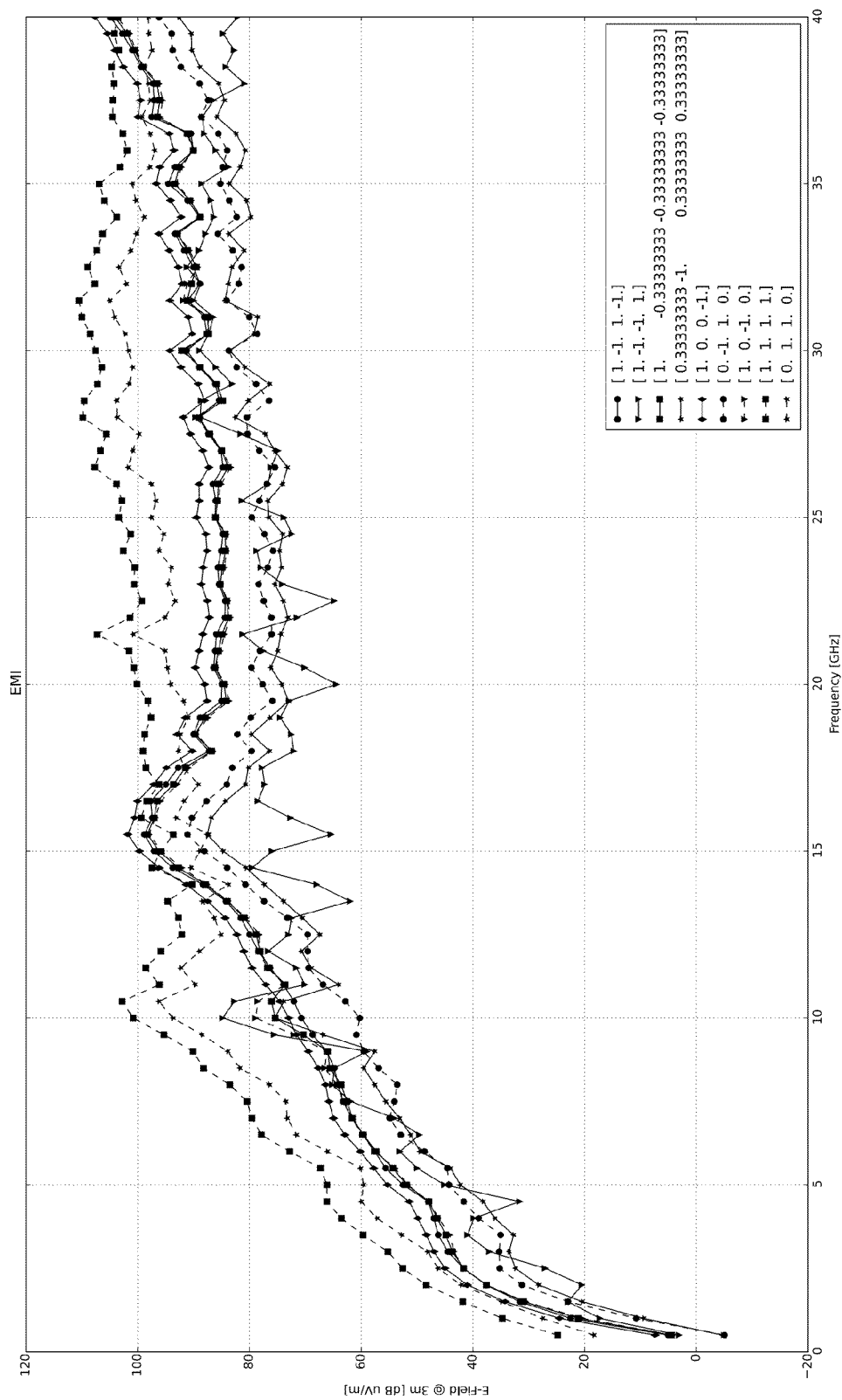
FIG. 4 is a graph showing calculated emissions for different codewords transmitted over the transmission line of FIGS. 2 and 3

In FIG. 4 we plot the simulated radiated emissions curves for each of the codewords given in Table 1. We notice that in average they respect the ordering given by our previous theoretical calculations. More specifically, the codeword [1, −1, −1, 1] has the lowest emissions across most of the plotted frequencies range, followed by the [⅓, −1, ⅓, ⅓] and [0, −1, 1, 0] codewords. However, we need to stress at this point the fact that there are at least two sources of imperfections with respect to the theoretical model which can cause and explain the deviations of the simulated results from the theoretical findings. First of all, the structure itself it is not truly an exact representation of the parallel conductors model used when deriving our theoretical results. Secondly, the neglected terms from the Taylor series expansion might sum constructively or destructively depending on the chosen codewords, changing the value of the calculated E-field.

Figure 5:
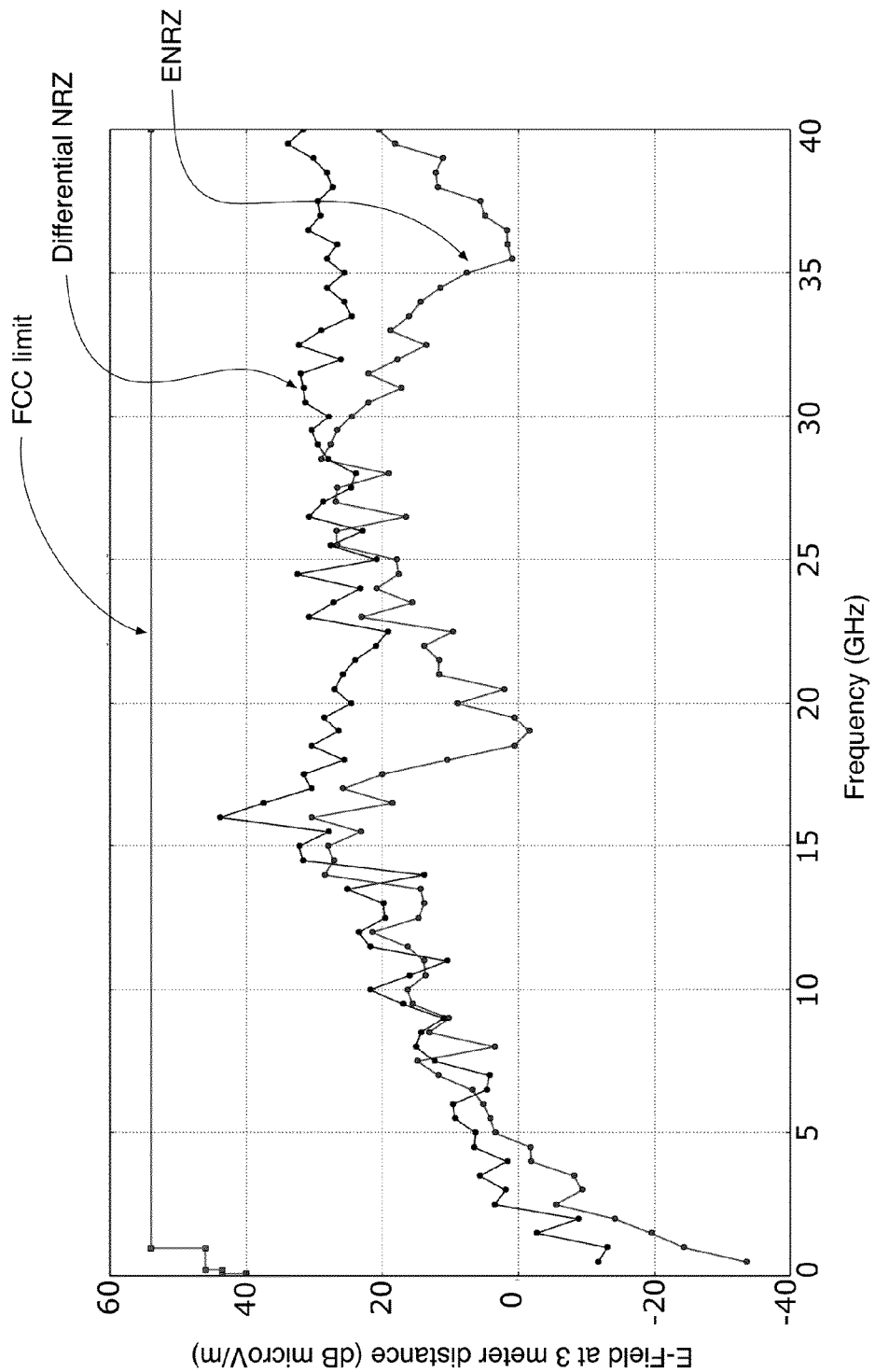
FIG. 5 is a graph comparing EMI emissions for Differential NRZ signaling and ENRZ signaling over the same wires at equivalent delivered data rates.

FIG. 5 is a graph comparing EMI emissions for Differential NRZ signaling and ENRZ signaling over the same wires at equivalent delivered data rates. The clock frequency for the Differential NRZ signaling is 28 GHz (translating to 112 Gbps delivered data rate over all 4 wires), and the clock frequency for ENRZ is 18.66 GHz (also translating to 112 Gbps delivered data rate over all 4 wires). As may be seen, although both signaling methods are below the FCC emissions limit in this simulation, ENRZ produces significantly less emission than Differential NRZ, especially in the regions between 17-22 GHz and above 30 GHz.

We claim:

1. A method comprising:
   receiving a set of data bits representing information;
   mapping the data bits to low electromagnetic interference (EMI) codewords in a set of low EMI codewords, wherein the set of low EMI codewords when represented as a polynomial are divisible by the polynomial $(X-1)^M$ where M is at least 1; and
   transmitting the set of low EMI codewords on a multiwire system.

2. The method of claim 1, wherein the set of low EMI codewords is generated from modulating an initial set of codewords represented as a polynomial of maximum degree N−M−1 and a polynomial $(X-1)^M$ where N is a number of wires in the multiwire system and M is an order of electromagnetic interference reduction, and wherein N>M.

3. The method of claim 2, wherein M is at least 2, representing a plurality of orders of electromagnetic interference reduction.

4. The method of claim 2, wherein the initial set of codewords are formed using a Hadamard matrix with a size of at least 3.

5. The method of claim 4, wherein the Hadamard matrix has a size of 4, and the initial set of codewords belong to an Ensemble Non-Return to Zero (ENRZ) code.

6. The method of claim 4, wherein the Hadamard matrix has a size of 8 (H8), and the initial codewords belong to an H8 code.

7. The method of claim 4, wherein the Hadamard matrix has a size of 16 (H16), and the initial codewords belong to an H16 code.

8. The method of claim 2, wherein N is at least 3.

9. The method of claim 2, wherein the low EMI codewords $C = \{c_1 \ldots c_N\}$ transmitted on N wires of the multiwire system satisfies at least a first and second relationship given by $\Sigma_{l=0}^{N-1} 1^K c_{il}$, the at least first and second relationships determined by consecutive integer values of K starting at zero, where $c_{il}$ represents an ith low EMI codeword component transmitted on wire l of the multiwire system.

10. The method of claim 2, wherein the low EMI codewords represent a portion of the initial set of codewords.

11. An apparatus comprising:
   an encoder configured to receive a set of bits representing information, and responsively generate a set of low electromagnetic interference (EMI) codewords, wherein the set of low EMI codewords when represented as a polynomial are divisible by the polynomial $(X-1)^M$ where M is at least 1; and
   a multiwire bus configured to transmit the set of low EMI codewords.

12. The apparatus of claim 11, wherein generating the set of low EMI codewords comprises modulating an initial set of codewords represented as a polynomial of maximum degree N−M−1 and a polynomial $(X-1)^M$ where N is a number of wires in the multiwire bus and M is an order of electromagnetic interference reduction, wherein N>M.

13. The apparatus of claim 12, wherein M is at least 2, representing a plurality of orders of electromagnetic interference reduction.

14. The apparatus of claim 12, wherein the low EMI codewords represent a portion of the initial set of codewords.

15. The apparatus of claim 12, wherein N is at least 3.

16. The apparatus of claim 12, wherein the initial set of codewords are formed using a Hadamard matrix with a size of at least 3.

17. The apparatus of claim 16, wherein the Hadamard matrix has a size of 4, and the initial codewords belong to an Ensemble Non-Return to Zero (ENRZ) code.

18. The apparatus of claim 16, wherein the Hadamard matrix has a size of 8 (H8), and the initial codewords belong to an H8 code.

19. The apparatus of claim 16, wherein the Hadamard matrix has a size of 16 (H16), and the initial codewords belong to an H16 code.

20. The apparatus of claim 11, wherein the low EMI codewords $C=\{c_1 \ldots c_N\}$ transmitted on N wires of the multiwire system satisfies at least a first and second relationship given by $\sum_{l=0}^{N-1} 1^K c_{il}$, the at least first and second relationships determined by consecutive integer values of K starting at zero, where $c_{il}$ represents an ith low EMI codeword component tranmsitted on wire l of the multiwire bus.

* * * * *